United States Patent [19]
Mudd et al.

[11] Patent Number: 5,568,345
[45] Date of Patent: Oct. 22, 1996

[54] OVERVOLTAGE PROTECTION CIRCUIT

[75] Inventors: Mark S. J. Mudd, Swindon, Great Britain; Ross Addinall, Gloucestershire, United Kingdom

[73] Assignee: Plessey Semiconductors Limited, United Kingdom

[21] Appl. No.: 324,914

[22] Filed: Oct. 18, 1994

[30] Foreign Application Priority Data

Nov. 3, 1993 [GB] United Kingdom ............... 9322697

[51] Int. Cl.$^6$ ............................................... H02H 9/04
[52] U.S. Cl. ........................................... 361/56; 361/111
[58] Field of Search ................................ 361/56, 111, 91

[56] References Cited

U.S. PATENT DOCUMENTS

| | | | |
|---|---|---|---|
| 4,282,556 | 8/1981 | Ipri | 361/56 |
| 4,704,654 | 11/1987 | Aberle et al. | 361/90 |
| 4,821,136 | 4/1989 | Murari et al. | 361/58 |
| 5,050,060 | 9/1991 | Geuns | 361/18 |

FOREIGN PATENT DOCUMENTS

| | | |
|---|---|---|
| 0166581A3 | 1/1986 | European Pat. Off. . |
| 0435047A2 | 7/1991 | European Pat. Off. . |
| 1004514 | 9/1965 | United Kingdom . |
| 1393748 | 5/1975 | United Kingdom . |
| WO88/03608 | 5/1988 | WIPO . |
| WO92/22950 | 12/1992 | WIPO . |

*Primary Examiner*—Todd DeBoer
*Attorney, Agent, or Firm*—Kirschstein, et al.

[57] ABSTRACT

An overvoltage protection circuit employs a series of semiconductor switching elements, each element having a control terminal and two main conduction terminals, in a totem pole configuration and two potential dividers whose tapping points feed, respectively, the control terminals and the main terminal junctions of the switching elements. Both the series of switching elements and the two potential dividers are connected between a reference node (zero volts) and a node to be protected from an electrostatic discharge. The resistive elements of the potential dividers are so arranged that, in the absence of a static discharge, all switching elements are cut off and experience a substantially equal voltage across the respective main terminals. In this way, the circuit may be usefully employed in integrated circuits which are based on a low-voltage integration process but which have also a high-voltage-supply rail (e.g. 30 V). The switching elements may be bipolar transistors, and preferably Darlington pairs.

6 Claims, 2 Drawing Sheets

OVERVOLTAGE PROTECTION CIRCUIT

BACKGROUND OF THE INVENTION

The invention concerns an overvoltage protection circuit, and in particular, although not exclusively, an electrostatic discharge protection circuit for an integrated circuit device for use with high-voltage power supplies.

Integrated circuits are often damaged by voltage transients which can overload active elements within the device and cause permanent damage. Diodes are used in most devices for internal transient protection, as shown in FIG. 1. In FIG. 1, diodes 11 and 12 are connected to an input node 13 of an integrated active circuit 14 (e.g. an amplifier) such that in normal operation they are reverse-biased, but when the node 13 is subjected to a transient outside the normal supply voltage range, one or other of diodes 11 and 12 becomes forward-biased and protects the internal circuitry of the active circuit.

A problem arises, however, when high-voltage supplies are to be used with integrated circuits formed by processes yielding inherently low-voltage devices. Under these circumstances, the diodes can be subjected to voltage drops which cause breakdown of the semiconductor junctions forming the diodes. An example of this is the use of a 30 v supply on an, integrated circuit comprising devices having a breakdown voltage of only 15 v.

It would be desirable to provide an overvoltage protection circuit which can be used in place of a conventional diode clamp to overcome the above-mentioned drawback.

SUMMARY OF THE INVENTION

According to a first aspect of the invention, there is provided an overvoltage protection circuit for connection between a first, reference node and a second node which is to be protected against over-voltage with respect to the first node, the protection circuit comprising a plurality of controllable switching elements connected in series between the two nodes, each switching element having a control terminal and first and second main terminals, .and biasing means connected to the plurality of switching elements, the biasing means being arranged, in the absence of an overvoltage, to bias the plurality of switching elements into a substantially non-conducting state and to establish voltages between the first and second main terminals of the respective switching elements, which are within a rated value for those elements.

The advantage of this arrangement is that at all times the voltage across all the switching elements is kept to within the rated limits for the switching devices used, even though the potential on the second node may be momentarily considerably higher than these limits.

The biasing means may comprise first and second potential divider chains, each chain being connected between the first and second nodes. The first potential divider chain may have a first plurality of tapping points and the second potential divider chain may have a second plurality of tapping points, the second plurality being equal to the first plurality minus one, the tapping points of the first divider chain being connected to corresponding control terminals of the plurality of switching elements, and the tapping points of the second divider chain being connected to corresponding main terminal junctions of the plurality of switching elements.

The potentials at the tapping points of the two divider chains are set by a suitable choice of impedance value for all the dividing elements in each chain to ensure that all the switching elements in the series configuration (totem pole) are in their cut-off state, as well as to:ensure that rated voltages across the switching elements are not exceeded.

The overvoltage protection circuit of the invention may be adapted for use with any quiescent voltage (i.e. even higher than the nominal 30–35 v envisaged) simply by varying the number of switching stages in the totem pole: the higher the voltage, the greater the number of stages.

Preferably, all the dividing elements within the second divider chain have substantially the same impedance value, and all the dividing elements within the first divider chain likewise, with the exception of the element in the first chain connected to the first node, which may be of lower impedance than the other elements in that chain. Use of like impedance values in the second chain ensures that all the switching elements see essentially the same voltage across their outputs under quiescent conditions (i.e. no overvoltage). This puts no one switching element under more strain than its fellows. A lower impedance value is used for the dividing element nearest the first node in the first divider chain to ensure that the switching element nearest to the first node is sufficiently turned off under quiescent conditions.

The switching elements may be bipolar transistors, and preferably Darlington pairs. The use of Darlington pairs ensures that, when an ESD does occur, there is sufficient current through the base of the output transistor of each pair to turn all the totem pole stages hard on, thereby creating a clamping action at the second node and dissipating the energy in the ESD.

The invention may be used in systems where the second node is at a higher potential than the first node, or at a lower potential than the first node (e.g. in ECL systems). In either case, the transistors may be either NPN or PNP types. With PNP types, however, poorer over-Voltage protection may be afforded due to the lower current-handling capacity of this type of transistor.

According to a second aspect of the invention, there is provided an active integrated circuit comprising an overvoltage protection circuit as described above.

An embodiment of the invention will now be described, by way ,of example only, with reference to the drawings, of which:

DETAILED DESCRIPTION OF THE INVENTION

Figure 2:
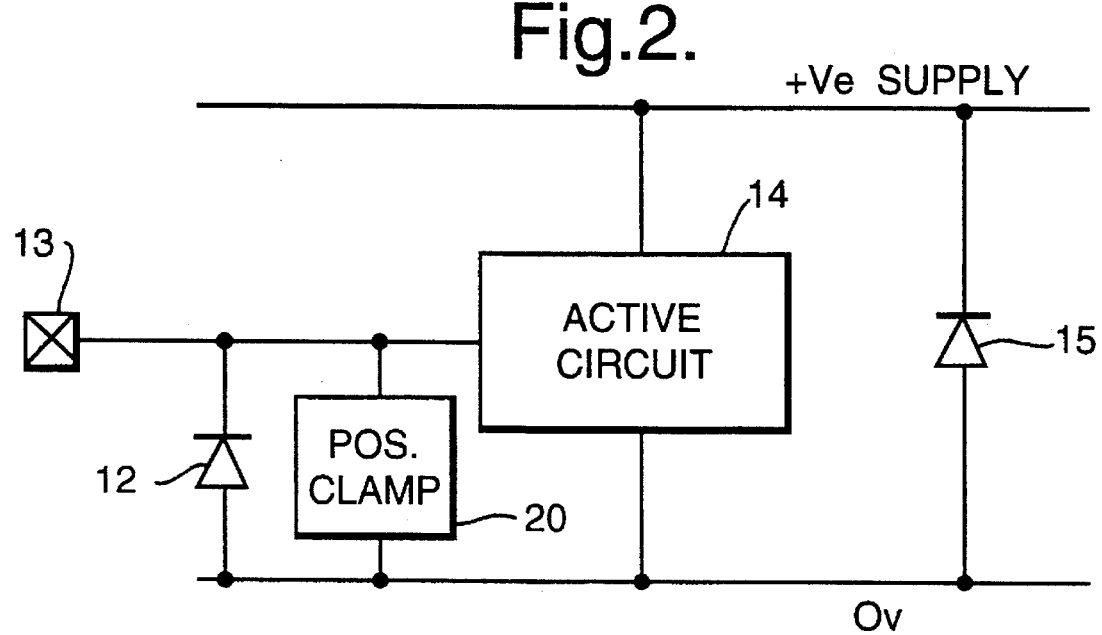
FIG. 2 is a schematic diagram of part of an integrated circuit including an ESD protection circuit according to a first embodiment of the invention.

Referring to FIG. 2, the positive diode clamp 11 is replaced by the first embodiment of an electrostatic discharge (ESD) protection circuit 20 according to the invention. The construction of such a protection (clamp) circuit is illustrated in FIG. 3.

Figure 3:
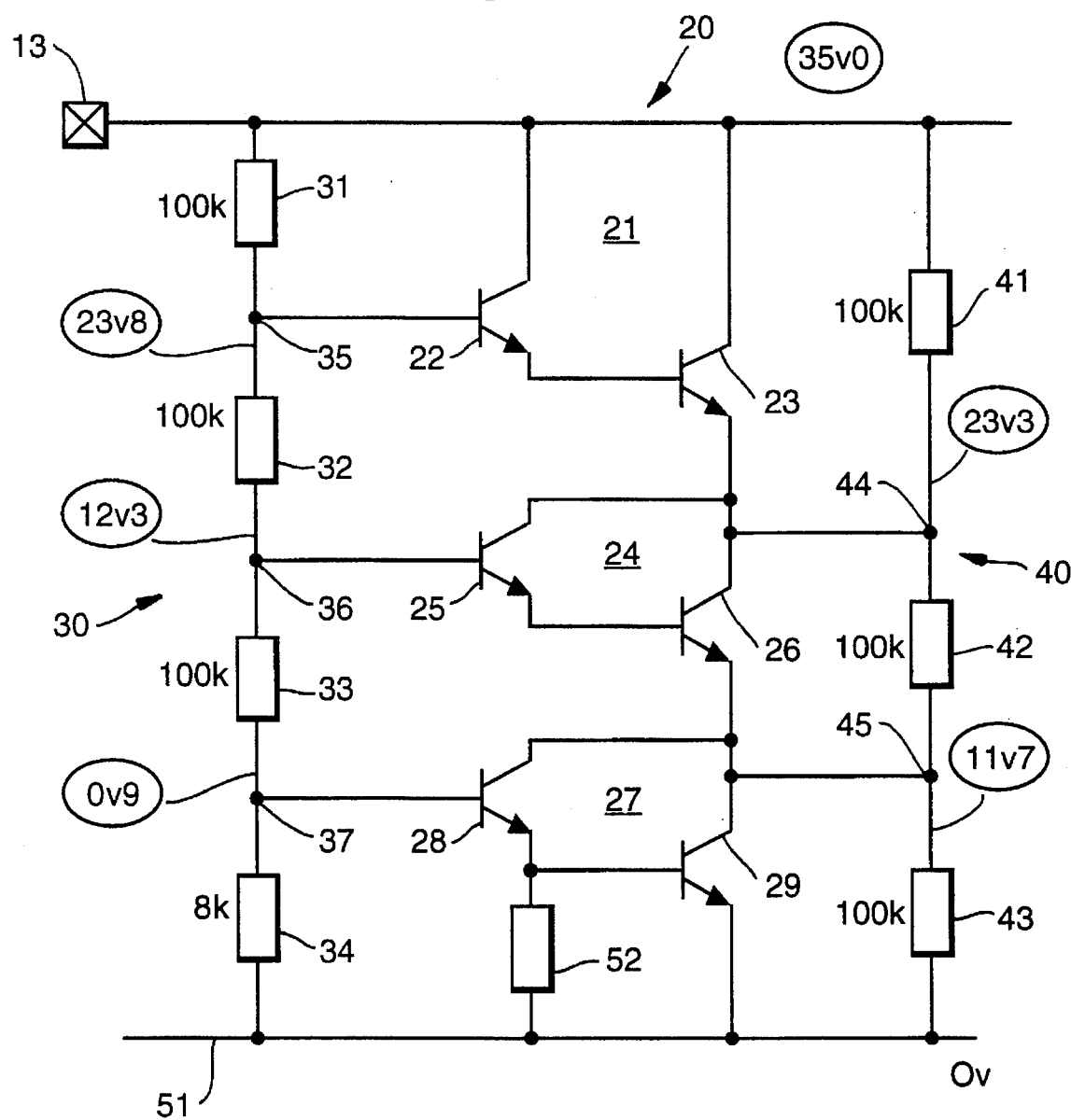
FIG. 3 is a schematic diagram of an ESD protection circuit according to the first embodiment of the invention.

In FIG. 3, a clamp circuit 20 comprises a number of Darlington NPN amplifying stages 21, 24, 27 arranged in a totem pole configuration between the node to be protected 13 and a zero-volt reference potential node 51. A potential divider chain 30, consisting of resistors 31, 32, 33 and 34, is connected between the node 13 and the reference node 51, and a further potential divider chain 40, consisting of resistors 41, 42, and 43, is connected between the same two nodes. Tapping points 35, 36, 37 on the first divider chain are taken to the respective bases of Darlington input transistors 22, 25, 28, while tapping points 44 and 45 are taken to respective emitter-collector junctions of Darlington output transistors 23, 26 and 29. A resistor 52 is coupled between the emitter of transistor 28 and the reference node 51.

The values of resistors 31, 32 and 33 are equal (e.g. 100 k), while that of resistor 34 is much less (e.g. 8 k). The relative values of these resistors are chosen to ensure that, under normal operating conditions (no overvoltage), the Darlington 27, and also Darlingtons 21 and 24, are biased in the OFF state. Resistor 52 provides a shunt path for the base current of transistor 29, ensuring it is held OFF. Resistors 41, 42 and 43, likewise equal in value (e.g. 100 k), bias the emitter-collector junctions of transistors 23, 26 and 29 to one-third and two-thirds of the supply voltage for the protection circuit, i.e. the voltage appearing on the node to be protected 13. Thus, with a normal operating voltage on node 13 of 30–35 V, none of the transistors in the circuit experiences more than 12 V between its collector and emitter, and hence the BVce and other breakdown voltages of these transistors are not exceeded. Typical resistance and quiescent (no ESD) voltage values are given in FIG. 3.

Now, when a positive ESD event (a "zap") occurs, the voltage on node 13 will rise rapidly. At a given voltage on this node, the voltage on node 37 will be sufficient to start to turn on transistor 28, which will in turn switch on Darlingtons 21 and 24 due to the extra current being sunk by transistor 28 through resistors 41 and 42, which lowers the potentials at tapping points 44 and 45. As the voltage on node 13 rises further, the voltage across resistor 34 becomes sufficient to turn transistor 29 on as well. A substantial current for the base of transistor 29 becomes available, sourced from transistor 28, and as a result a large current flows through the collectors of the output transistors 23, 26, 29. This large current is sufficient to dissipate the energy in the ESD zip and prevents the potential on node 13 rising to a level which would destroy the device. After the ESD energy has been dissipated, the potential on node 13 returns to its normal level and Darlingtons 21, 24, and 27 return to their OFF state.

The cut-in voltage for the circuit, i.e. the voltage at which transistor 28 starts to conduct, is governed by the value of resistor 34 in conjunction with the value of the other resistors in divider chain 30. For the resistor values given in FIG. 3, cut-in occurs when the potential on node 13 rises to approximately 45 V. At that voltage, there is a volt-drop of 15 V across each of the transistors in the totem pole, which voltage might be near the maximum allowable in an actual integration process.

While the ESD protection circuit has been described within the context of an integrated circuit process, it is clear that the circuit can also be employed in discrete form. Indeed, the circuit was built in discrete form by the inventors during development, with component values set for a normal operation of 35 V and a cut-in voltage of 45 V, as illustrated in FIG. 3. The device was demonstrated to provide ESD zap protection for up to 8 kV using a military standard 883 HBM zap test.

Figure 1:
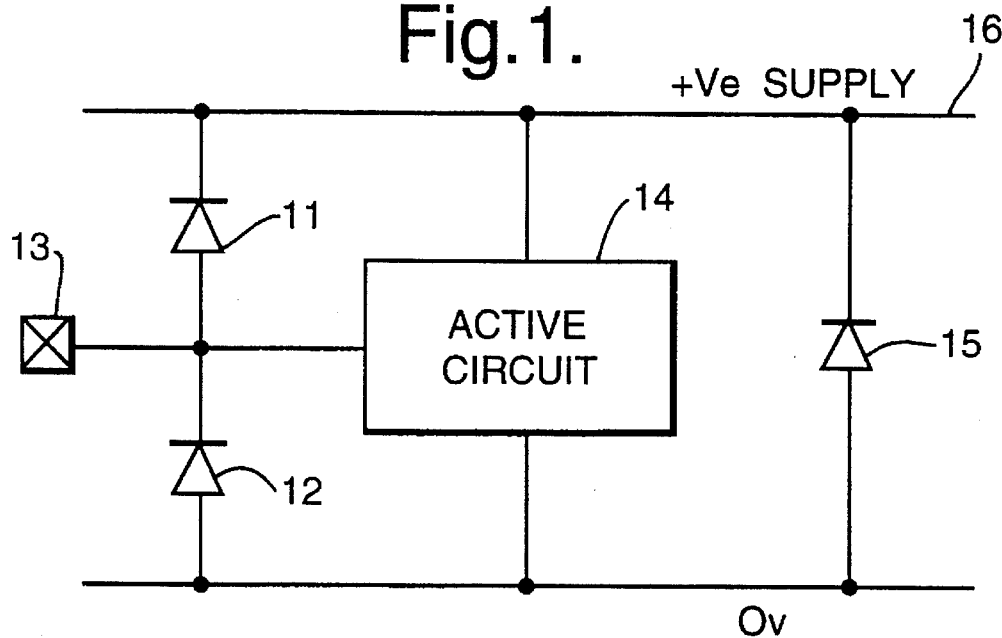
FIG. 1 is a schematic diagram of part of an integrated circuit including known ESD protection means.

As well as being suitable for use in the protection of signal nodes in an active integrated circuit, the ESD protection circuit of the invention can also be employed to clamp a voltage supply line feeding such an integrated circuit. Thus, the clamp circuit 20 shown in FIG. 2 can also be used in parallel with the negative diode clamp 15, shown in both FIG. 1 and FIG. 2, in order to protect the positive supply line 16 from a positive-going static discharge.

We claim:

1. An overvoltage protection circuit for connection between a first, reference node and a second node which is to be protected against overvoltage with respect to the first node, the protection circuit comprising: a first plurality of controllable switching elements each having a control terminal and first and second main terminals, said first plurality of switching elements being connected in series between said first and second nodes by way of a second plurality of junctions between respective first and second main terminals of adjacent ones of said first plurality of switching elements, the second plurality being equal to the first plurality minus one; biasing means connected to said first plurality of switching elements and including first and second potential divider chains each connected between said first and second nodes, the first potential divider chain having a third plurality of tapping points, the second potential divider chain having a fourth plurality of tapping points, the fourth plurality being equal to the third plurality minus one, the tapping points of the first potential divider chain being connected to corresponding control terminals of the first plurality of switching elements, the tapping points of the second potential divider chain being connected to corresponding ones of said junctions between said respective main terminals of said switching elements; and said biasing means being arranged, in the absence of an overvoltage, for biasing the first plurality of switching elements into a substantially non-conducting state, and for establishing voltages between the first and second main terminals of the respective switching elements which are within a rated value for said switching elements.

2. The overvoltage protection circuit according to claim 1, wherein the second potential divider chain has dividing elements all of substantially the same impedance value, and wherein the first potential divider chain has dividing elements all of substantially the same impedance value, except for the dividing element of the first potential divider chain that is connected to the first node.

3. The overvoltage protection circuit according to claim 1, wherein the switching elements are bipolar transistors.

4. The overvoltage protection circuit according to claim 3, wherein the transistors are Darlington pairs.

5. The overvoltage protection circuit according to claim 4, wherein the Darlington pairs are pairs of NPN transistors.

6. The overvoltage protection circuit according to claim 4, wherein the Darlington pairs are pairs of PNP transistors.

* * * * *